W. L. BEATY.
HAND GRIP FOR FISHING RODS.
APPLICATION FILED NOV. 21, 1919.
1,375,668.
Patented Apr. 26, 1921.
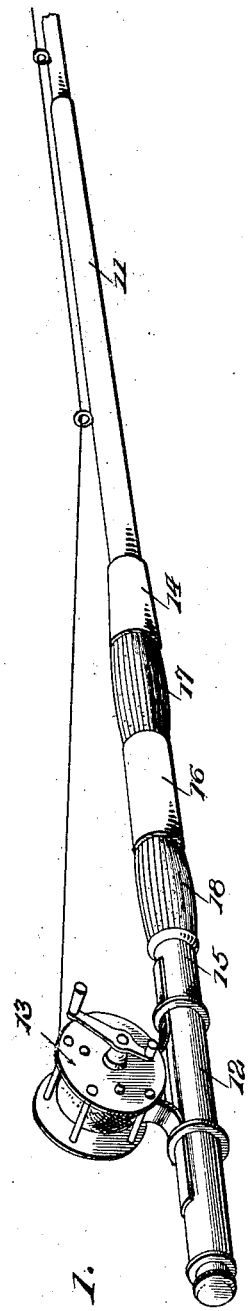
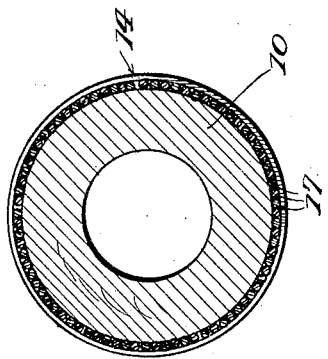
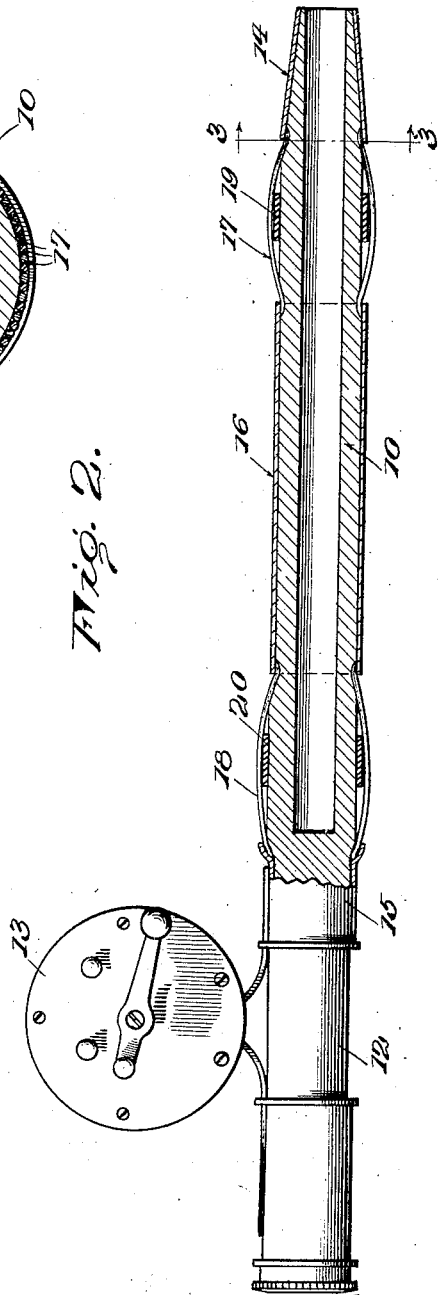
Inventor.
Wilbur L. Beaty

UNITED STATES PATENT OFFICE.

WILBUR L. BEATY, OF SOUTH BUTTE, MONTANA.

HAND-GRIP FOR FISHING-RODS.

1,375,668.   Specification of Letters Patent.   Patented Apr. 26, 1921.

Original application filed April 16, 1919, Serial No. 290,623. Divided and this application filed November 21, 1919. Serial No. 339,625.

*To all whom it may concern:*

Be it known that I, WILBUR L. BEATY, citizen of the United States, residing at South Butte, in the county of Silver Bow and State of Montana, have invented certain new and useful Improvements in Hand-Grips for Fishing-Rods, of which the following is a specification.

This invention relates to an improved hand grip for fishing rods, being a division of my pending application for fishing rod handle, filed April 16, 1919, Serial Number 290,623.

The invention has as one of its principal objects to provide a hand grip which will be particularly light in weight and which will provide an effective hand grasp.

A further object of the invention is to provide a grip which will be unusually neat and attractive in appearance.

And the invention has as a still further object to provide a grip which may be incorporated into the construction of substantially any conventional type of fishing rod handle.

Other and incidental objects will appear hereinafter.

In the drawings:

Figure 1 is a perspective view showing my improved hand grip in connection with a fishing rod of the type illustrated in my pending application previously identified.

Fig. 2 is a fragmentary longitudinal section taken centrally through the hand grip, and Fig. 3 is a transverse sectional view taken on the line 3—3 of Fig. 2 and looking in the direction of the arrows.

In carrying my invention into effect, I employ a preferably hollow core 10 adapted to receive at its forward end a fishing rod as conventionally illustrated at 11. In the drawings, I have shown a reel seat 12 connected to the rear end of the core, this reel seat forming the subject matter of my pending application referred to. A conventional reel 13 is indicated in position upon the reel seat.

Fixed upon the forward end portion of the core 10 is a ferrule 14. A ferrule 15 is also fixed upon the rear end portion of said core and tightly fitted upon the core at a point substantially midway between these ferrules is a sleeve 16. This sleeve is preferably formed of celluloid and provides the intermediate portion of the hand grip. The remainder of the grip is formed by quill covered areas 17 and 18 respectively. Porcupine quills are preferably employed. The quills of the first area are arranged side by side in abutting relation to extend entirely around the core and the forward ends of said quills are, as particularly shown in Fig. 2, engaged beneath the rear margin of the ferrule 14 while the rear ends of said quills are engaged beneath the forward end of the sleeve 16. Holding the intermediate portions of these quills against distortion or displacement is a band 19 of adhesive tape snugly engaged around the core and arranged with its adhesive surface presented to the quills so that the quills are thus secured by the band. The quills of the area 18 are mounted in like manner. The forward ends of the quills of this latter area are engaged beneath the rear end of the sleeve 16 while the rear ends of said quills are engaged beneath the forward end of the ferrule 15. Securing the intermediate portions of said quills is a band 20 of adhesive tape corresponding to the band 19 and arranged in like manner. Thus, it will be seen that the quill covered areas will afford a firm purchase for the hand. At the same time, the hand grip will be particularly light and will not be subject to corrosion.

Having thus described the invention, what is claimed as new is:

1. A hand grip for fishing rods including a core, a plurality of members circular in cross section arranged around the periphery of the core to extend longitudinally thereof and covering an area of the core, means carried by the core and securing said members at their ends, and a band of adhesive tape around the core and having its adhesive coated face presented outwardly to secure the intermediate portions of the members.

2. A hand grip for fishing rods and the like comprising a core having a plurality of members circular in cross section laid side by side thereon in abutting relation to extend longitudinally of the core whereby a gripping surface having longitudinal corrugations is provided.

3. In a hand grip for fishing rods and the like, the combination of a core, and quills circular in cross section arranged side by side upon the core and forming a pliable gripping surface having longitudinal corrugations.

4. In a hand grip, the combination of a core, a band of adhesive tape engaged around the core and having its adhesive coated face presented outwardly, and a plurality of quills arranged about the core to extend longitudinally thereof in abutting relation to form a gripping surface having longitudinal corrugations, the intermediate portions of said quills extending across the adhesive coated face of said tape to be secured thereby.

In testimony whereof I affix my signature.

WILBUR L. BEATY. [L. S.]